", "(12) United States Patent
Stewart et al.

(10) Patent No.: US 6,952,157 B1
(45) Date of Patent: Oct. 4, 2005

(54) SYSTEM AND METHOD FOR CONCURRENTLY ADDRESSING MULTIPLE RADIO FREQUENCY IDENTIFICATION TAGS FROM A SINGLE READER

(75) Inventors: Roger G. Stewart, Morgan Hill, CA (US); John Rolin, Morgan Hill, CA (US); Steve Smith, Berkeley, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 273 days.

(21) Appl. No.: 10/140,552

(22) Filed: May 7, 2002

Related U.S. Application Data

(60) Provisional application No. 60/294,662, filed on May 31, 2001.

(51) Int. Cl.[7] ............................ H04Q 5/22; H04Q 9/00; G08Q 5/22; G06F 17/00
(52) U.S. Cl. ............................... 340/10.2; 340/825.49; 340/5.91; 235/375
(58) Field of Search .......................... 340/10.2–10.42, 340/825.49, 5.91; 235/375–385

(56) References Cited

U.S. PATENT DOCUMENTS 3,914,762 A * 10/1975 Klensch ..................... 340/5.61
5,686,902 A * 11/1997 Reis et al. .................. 340/10.2
5,850,187 A * 12/1998 Carrender et al. ......... 340/10.6
5,940,006 A * 8/1999 MacLellan et al. ........ 340/10.1
5,974,368 A * 10/1999 Schepps et al. ............ 340/5.61
6,480,143 B1 * 11/2002 Kruger et al. ................ 342/44
6,617,962 B1 * 9/2003 Horwitz et al. ............. 340/10.4
6,745,008 B1 * 6/2004 Carrender et al. .......... 455/41.1

FOREIGN PATENT DOCUMENTS

WO    WO 92/14307    * 8/1992    ............ H04B 1/59

* cited by examiner

*Primary Examiner*—Michael Horabik
*Assistant Examiner*—Scott Au
(74) *Attorney, Agent, or Firm*—Zilka-Kotab, PC

(57) ABSTRACT

A system and method are provided in which each reader may conduct concurrent, yet independent, dialog with multiple tags at the same time using two or more phase channels. The reader itself may communicate with multiple tags via the same antenna, or using multiple antennae where each antenna operates on a separate phase channel. Upon receipt from the reader of an instruction for the tags to randomize, the tags randomly choose and assign a phase channel that will be their time reference for subsequent operation, or the channel can be assigned by the reader. The tags receive reader data encoded in the clock signal from the reader, and select the reader data pertaining to the particular tag based on the selected phase channel.

37 Claims, 8 Drawing Sheets

8 CHANNEL DECODER

SYSTEM AND METHOD FOR CONCURRENTLY ADDRESSING MULTIPLE RADIO FREQUENCY IDENTIFICATION TAGS FROM A SINGLE READER

RELATED APPLICATIONS

This application claims priority from U.S. Provisional Patent Application entitled "Phase Channels," filed on May 31, 2001 under Ser. No. 60/294,662 and which is herein incorporated by reference in its entirety.

FIELD OF THE INVENTION

The present invention relates to radio frequency identification (RFID), and more particularly, this invention relates to simultaneously addressing multiple RFID tags from a single reader.

BACKGROUND OF THE INVENTION

Radio frequency identification (RFID) is a technology that incorporates the use of electromagnetic or electrostatic coupling in the radio frequency (RF) portion of the electromagnetic spectrum to uniquely identify an object, animal, or person. RFID is coming into increasing use in industry as an alternative to the bar code. The advantage of RFID is that it does not require direct contact or line-of-sight scanning. RFID is sometimes also called dedicated short range communication (DSRC).

RFID tags can be passive or active. Active tags are typically powered by an energy source, such as an internal battery. Passive tags depend on an external power source to function.

A reader interrogates each tag to learn the tag's identity, uploads information from that tag, and then repeats the process with each of the remaining tags in sequence. Traditionally, in reading a group of tags, a reader communicates with tags one at a time so that the receiver within the reader is not confused by mixed data from many tags at the same time. The method of resolving individual tag data from a population of multiple tags is called anti-collision. Existing anti-collision methods generally suffer from slow multiple tag reading rates, and read rates can be severely reduced with large tag populations.

RFID tags can be attached to items in order to identify them for a variety of purposes. For example, RFID systems utilizing readers and tags can be used in a store environment to identify individual items for purposes of inventory control and purchasing transactions. In a typical store that has several readers spread throughout the store, the operational regions of readers can overlap and tags can communicate with several readers simultaneously.

The tag circuitry typically requires multiple clock cycles in order to perform any given function. The actual clock frequency and the number of clock cycles required for a function to be performed determines the data rate at which the tag can receive or transmit information. If the clock frequency is too low for the desired data rates, "one shots" and complex timing circuits are required to control the ordering of events within the tag.

One problem inherent in the prior art is power constraint. Passive tags have no battery and are powered by the RF energy transmitted by the reader. The more power a tag consumes, the closer the tag needs to be to a reader in order to operate. A corollary is that the less power or voltage a tag requires to operate, the farther a tag can be from a reader and still operate. Also, as the input voltage decreases, propagation delays within the tag circuitry increases, thereby reducing the operational speed of the tag. In many cases, the reduction in speed will cause the tag to operate improperly or not at all.

It follows that the number of tags that can be interrogated in a unit of time increases as the power increases. It also follows that the range at which a tag can be interrogated increases as the power required to operate that tag decreases.

Another problem arises in a typical store that might have several readers and several overlapping areas of interrogation. In this scenario, when tags are interrogated only one at a time and the entire bandwidth is occupied while a tag is being interrogated, only one reader and one tag can communicate at a given time in a given bandwidth.

It would therefore be advantageous to prevent, or at least limit, interference among multiple tags and/or multiple readers. It would also be desirable that the read speed (or read rate) of a multi-tag system be as high as possible.

DISCLOSURE OF THE INVENTION

A system and method are provided in which each reader may conduct concurrent, yet independent, dialog with multiple tags at the same time using two or more phase channels. This increases the range and throughput of the system while decreasing the cost of the tag.

The reader itself may communicate with multiple tags via the same antenna. The reader may also have multiple antennae, each antenna operating on a separate phase channel.

Upon receipt from the reader of an instruction for the tags to randomize, the tags randomly choose and assign a phase channel that will be their time reference for subsequent operation. Alternatively, the channel can be assigned by the reader. In either case, the phase channel assignment can be stored, preferably for at least one second, so that short-duration intermittent power losses do not alter the selected channel assignments.

The tags receive reader data encoded in the clock signal from the reader (such as via pulse width modulation), and select the reader data pertaining to the particular tag based on the selected phase channel.

A SYNC command may be used to resynchronize the clock timing and channel timing of the tags. Preferably, the SYNC command suspends a first task currently being performed, and allows performing a second task while the first task is suspended and/or interjecting and triggering a command while the first task is suspended.

In one embodiment, the tag may enter a static suspend mode powered independently of the reader signal.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
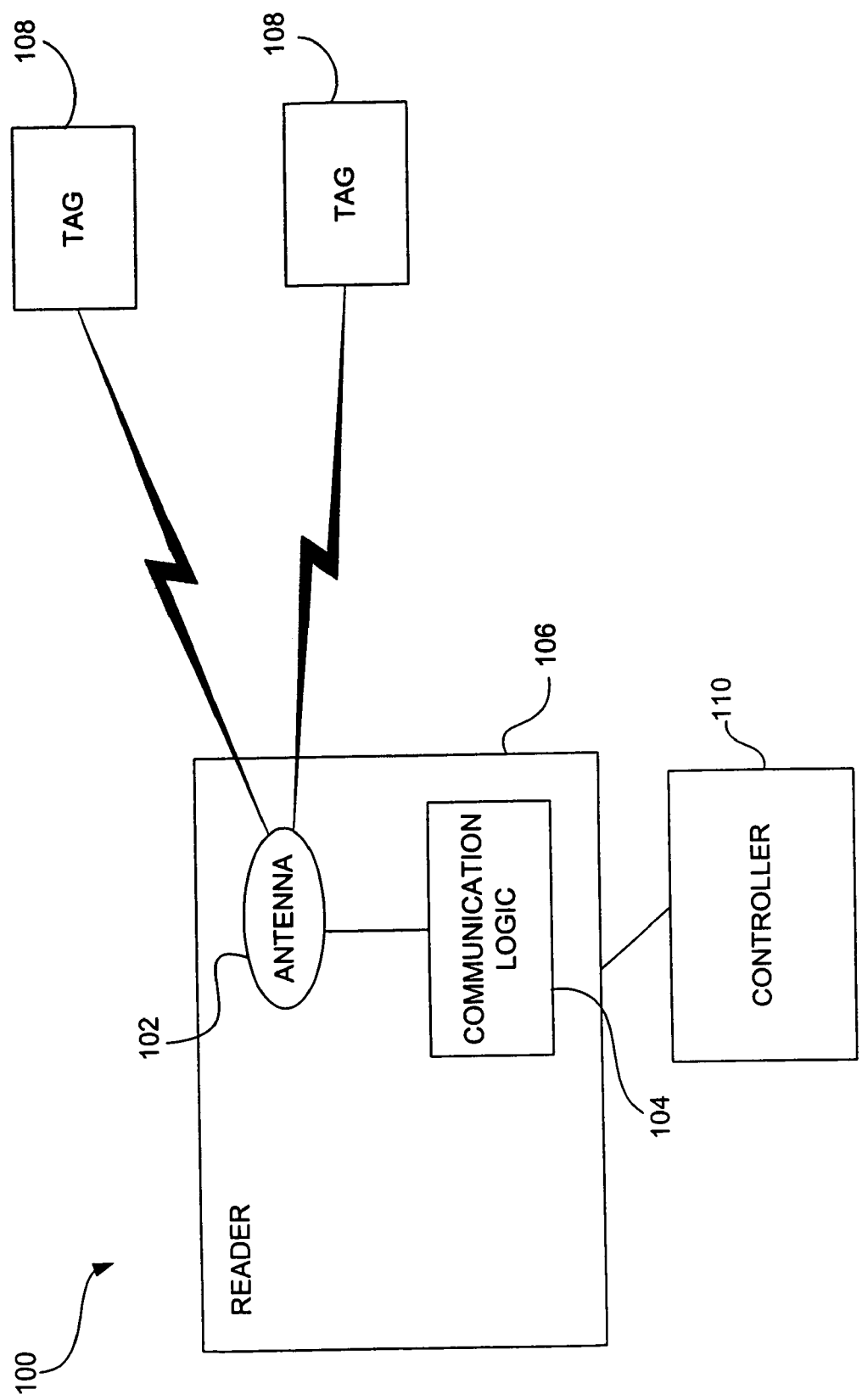
FIG. 1 depicts an RFID system according to one embodiment.

FIG. 1 depicts an RFID system 100 according to one embodiment. As shown, the system includes three components: an antenna 102 and transceiver 104 (here combined into one reader 106) and one or more transponders 108 (the tags). The transceiver is a combination transmitter/receiver in a single package. The antenna uses radio frequency waves to transmit a signal that activates a tag. When activated, the tag transmits data back to the antenna. The data is used to notify a programmable logic controller 110 that an action should occur. The action could be as simple as raising an access gate or as complicated as interfacing with a database to carry out a monetary transaction. High and low-frequency systems may be used in any of the embodiments described herein. Illustrative low-frequency RFID systems (30 KHz to 15 MHz) have short transmission ranges (generally less than six feet). Illustrative high-frequency RFID systems (850 MHz to 950 MHz and 2.4 GHz to 2.5 GHz) offer longer transmission ranges (more than 90 feet).

Consider the case where one reader reads a population of tags. A reader sends clock and data information to the tags. The reader transmits RF energy that is amplitude modulated to provide a clock frequency reference for the tag. The tag detects the decrease in radio frequency input power and triggers on the falling edge.

Figure 2:
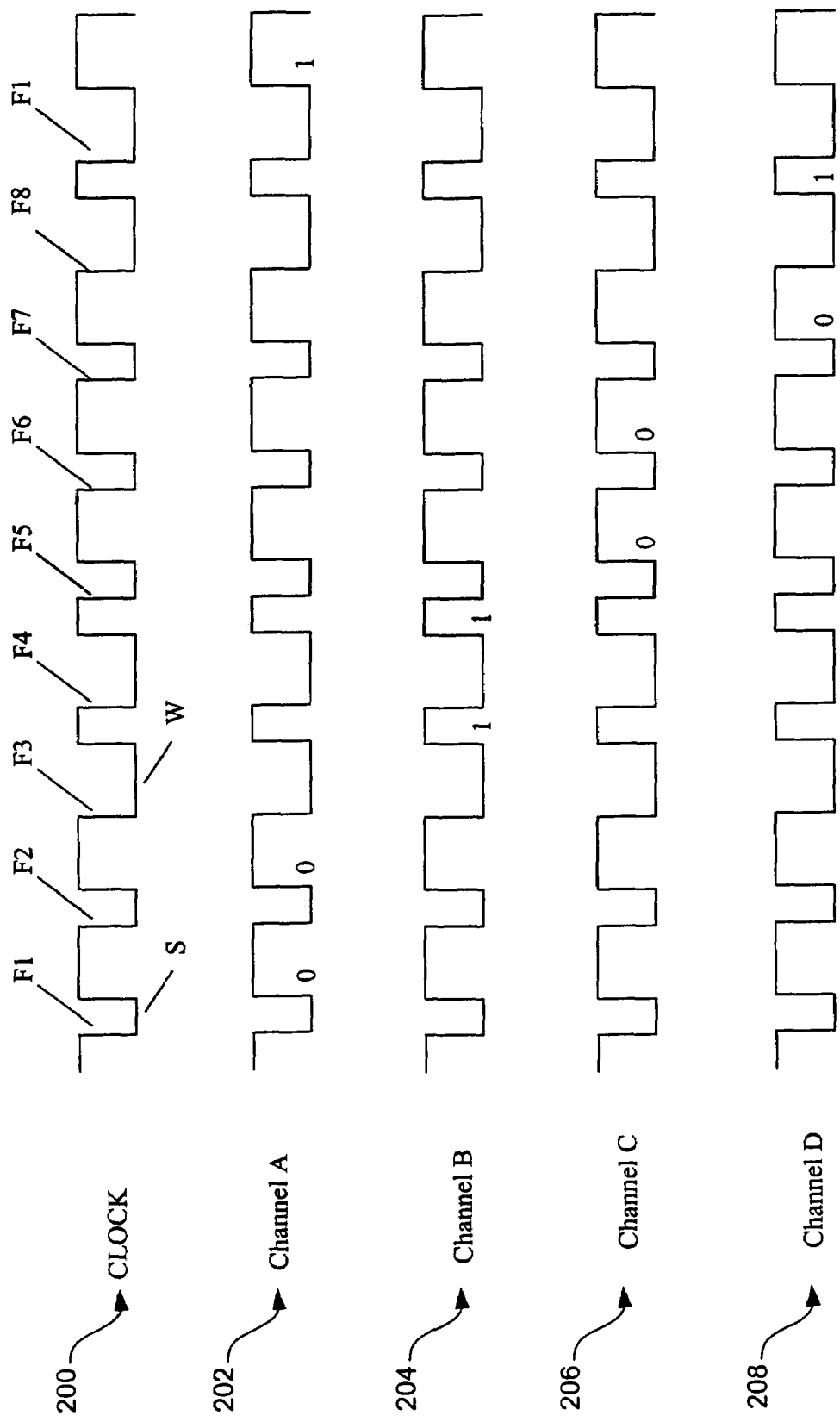
FIG. 2 illustrates an embodiment of phase channeling with four channels.

FIG. 2 illustrates a simplified example of four phase channels 202, 204, 206, 208 for one reader and four tags, where each tag is in a different phase channel. Although the clock waveform 200 is shown as a rectangular pulse train, it is representative of modulated RF energy. In this figure, the high level state represents RF energy being supplied to the tag by the reader. The low level state represents a lower RF energy level (it could be zero) being transmitted by the reader.

First, upon receipt from the reader of an instruction for the tags to randomize, the 110 tags will randomly choose a phase channel that will be their time reference for subsequent operation. In FIG. 2, Tag A has chosen a phase channel (Channel A) 202 that is referenced to Clock Falling Edge 1 (F1), (that is Tag A's frame of reference in time is Clock Falling Edge 1 (F1)), Tag B has chosen a phase channel 204 referenced to Clock Falling Edge 3 (F3), Tag C has chosen a phase channel 206 referenced to Clock Falling Edge 5 (F5), and Tag D has chosen a phase channel 208 referenced to Clock Falling Edge 7 (F7).

The low-level pulse widths define the data value of information sent by the reader to the tags. A short pulse width (S) corresponds to a "0" and a wide pulse width (W) corresponds to a "1". (Pulse width modulation as a form of data transmission is well known in the art.) Data is sent in two-bit pairs that are referred to as a reader data pair. Each reader data pair in the illustration in FIG. 2 consists of two clock cycles. At the beginning of its respective phase channel, each tag can receive a reader data pair from the reader (for example, 00 for Tag A, 11 for Tag B, 00 for Tag C and 01 for Tag D). After the completion of four reader data pairs or eight clock cycles, the process can reoccur, as illustrated by the "1" received by Tag A after the second occurrence of falling edge F1.

Figure 3:
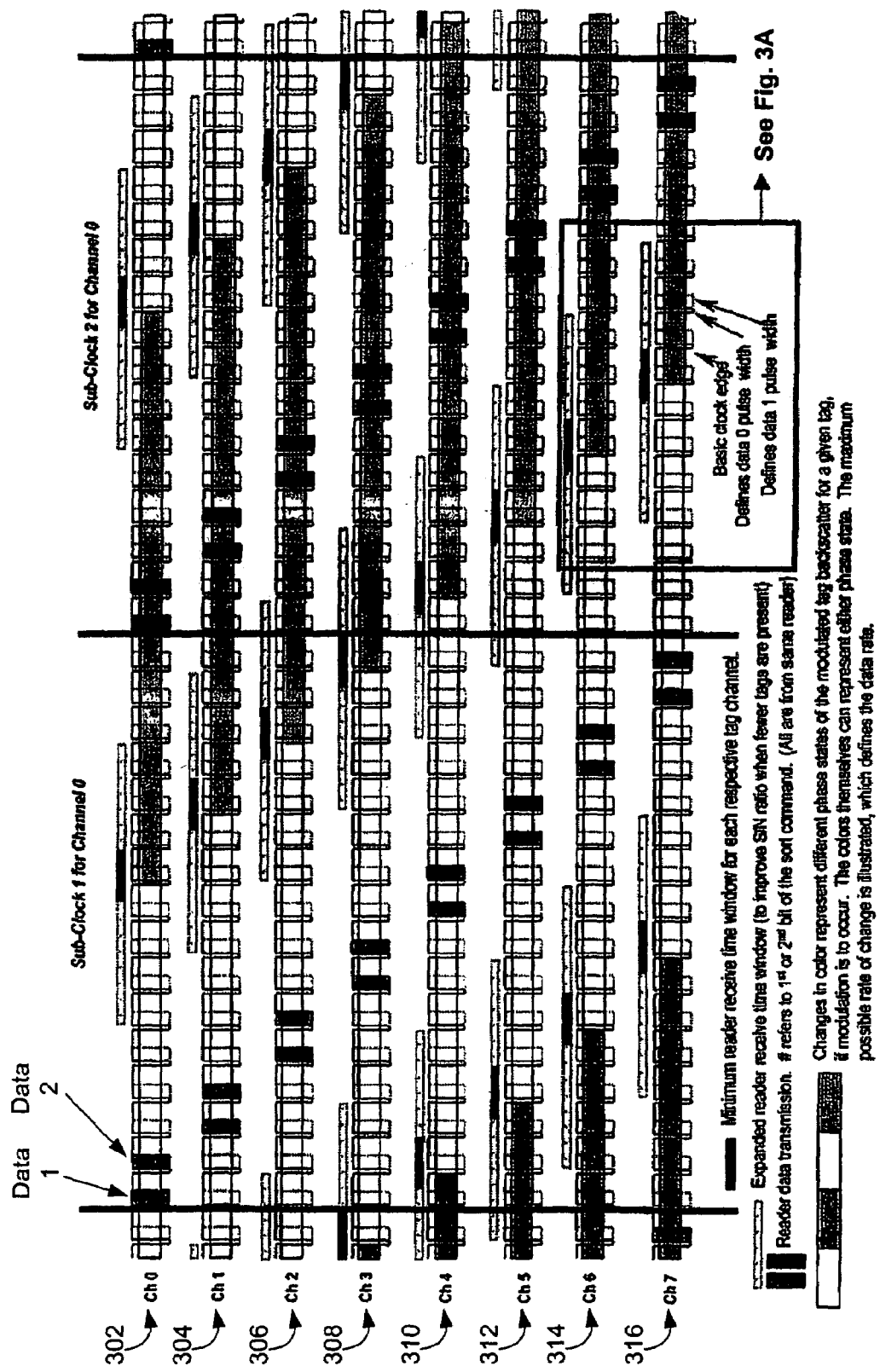
FIG. 3 illustrates an embodiment of phase channeling with eight channels.

FIG. 3 is an example illustrating a single reader and eight phase channels 302, 304, 306, 308, 310, 312, 314, 316. For simplicity of explanation, consider the case of 8 tags, each tag in a separate channel. The illustration indicates that each of the 8 tags has been assigned to one of 8 separate channels by a randomizing function within the tag electronics (often an integrated circuit, or chip).

Figure 3A:
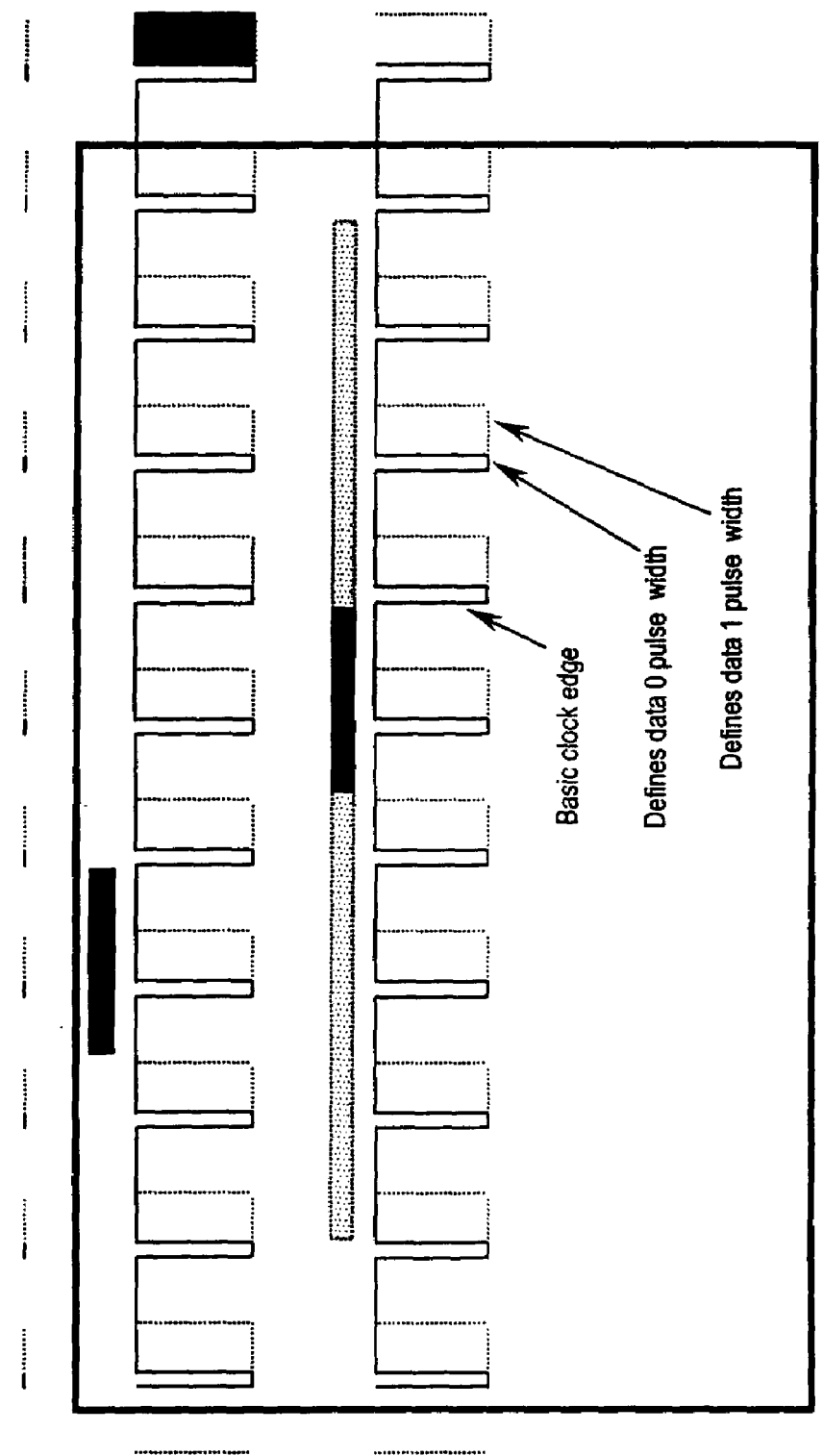
FIG. 3A is a detailed view of a portion of the phase channeling shown in FIG. 3.

FIG. 3 illustrates a reader sending information and receiving information and tags receiving information and sending information, respectively. The line that is moving most frequently is a clock signal that is transmitted by the reader. The falling edge of this signal is the clock edge. After going low, the signal returns to the high level at either the solid line (causing a narrow pulse), or it can return to the high level at the dotted line (causing a wide pulse) in order to define the data state. Reader data is encoded into the clock pulses in this manner. The rise indicated by the solid lines represents the state "0" and the rise indicated by the dotted lines represents the state "1". See also FIG. 3A.

Assume that upon receipt of an instruction to randomize, each of the eight tags chooses a different phase channel. (Note that in practice, a uniform distribution of a multitude of tags into the available channels is approximated but not necessarily achieved.) For example, Tag 0 is referenced to the falling clock edges highlighted by the bold vertical lines that recur every 16 clock cycles. In this illustration, the first bit of data received by a tag is labeled as a 1 and the second bit of data as a 2. It should be noted that any number of data bits could be transmitted from a reader to a tag, and that the two bit command transmission illustrated is simplified to enhance understanding.

One complete set of 8 channels (16 clock cycles) is called a sub-clock period, and defines the fundamental data rate of a given tag. In this example, reader commands longer than 2 bits are distributed over multiple sub-clock periods. The sub-clock period is the same for all eight channels, but they are staggered from one another in time by two clock cycles.

Figure 4:
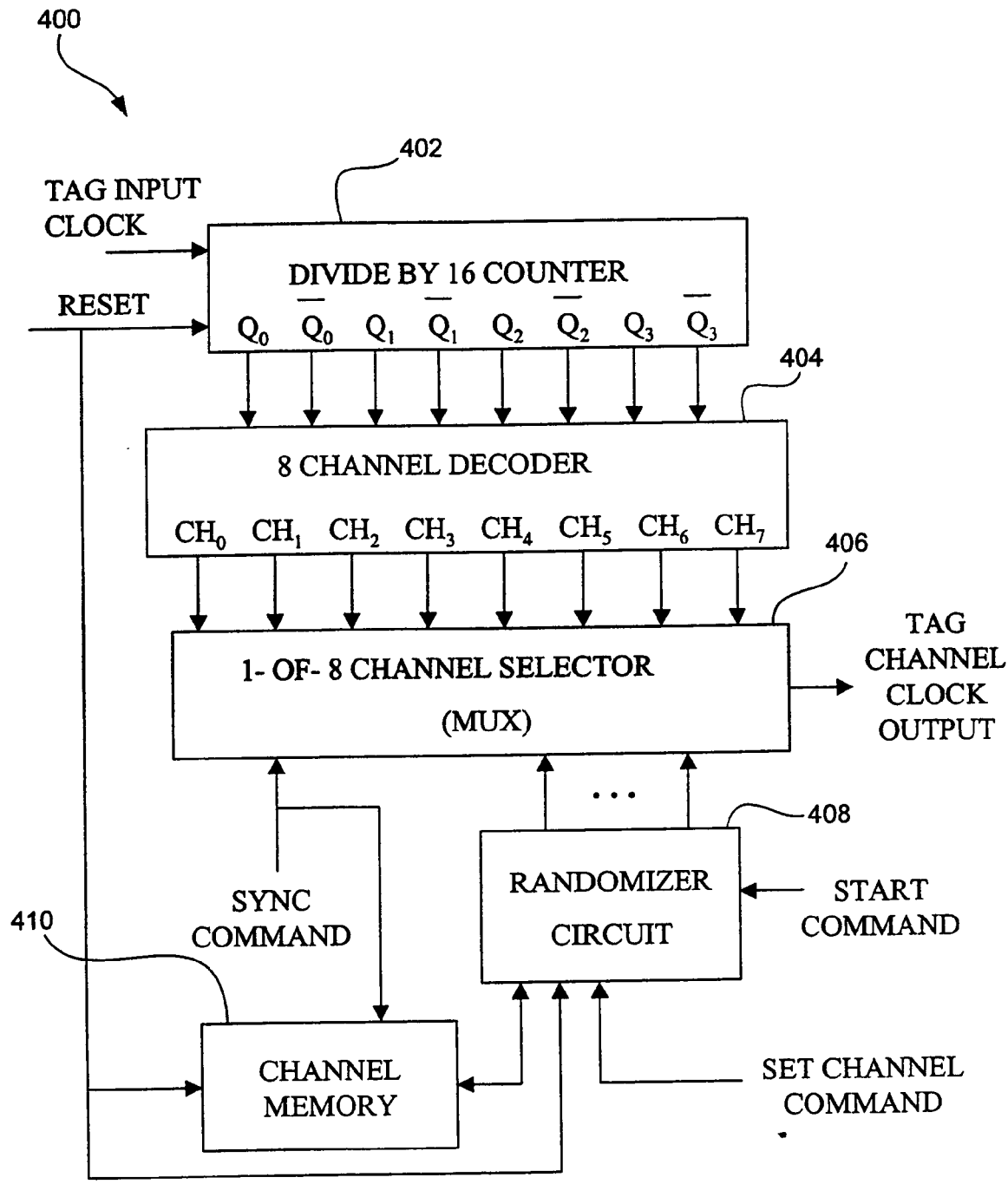
FIG. 4 is a circuit diagram for phase channelization control within a tag according to a preferred embodiment.
Figure 5:
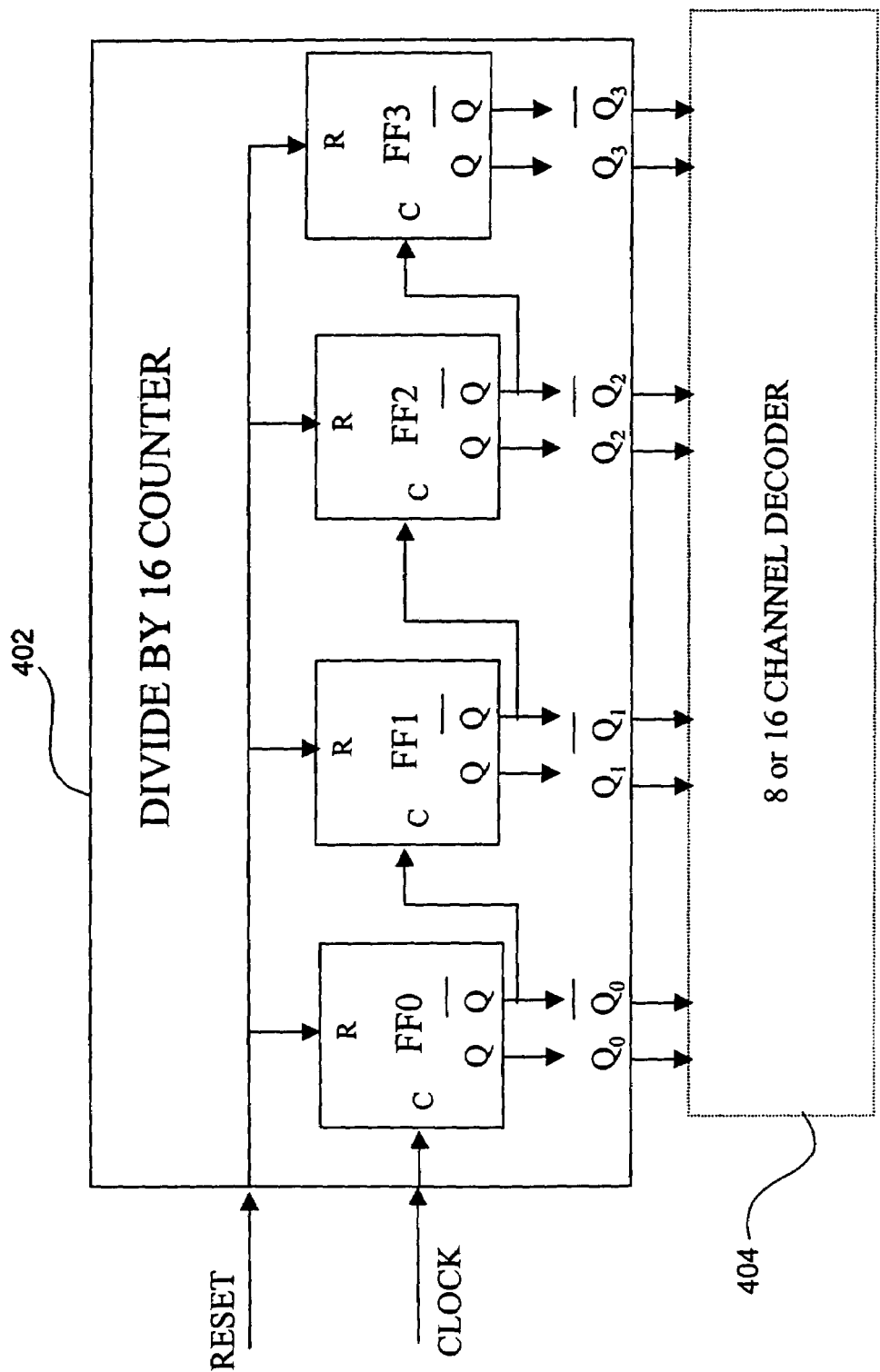
FIG. 5 is a circuit diagram of the DIVIDE BY 16 COUNTER of the circuit shown in FIG. 4.
Figure 6:
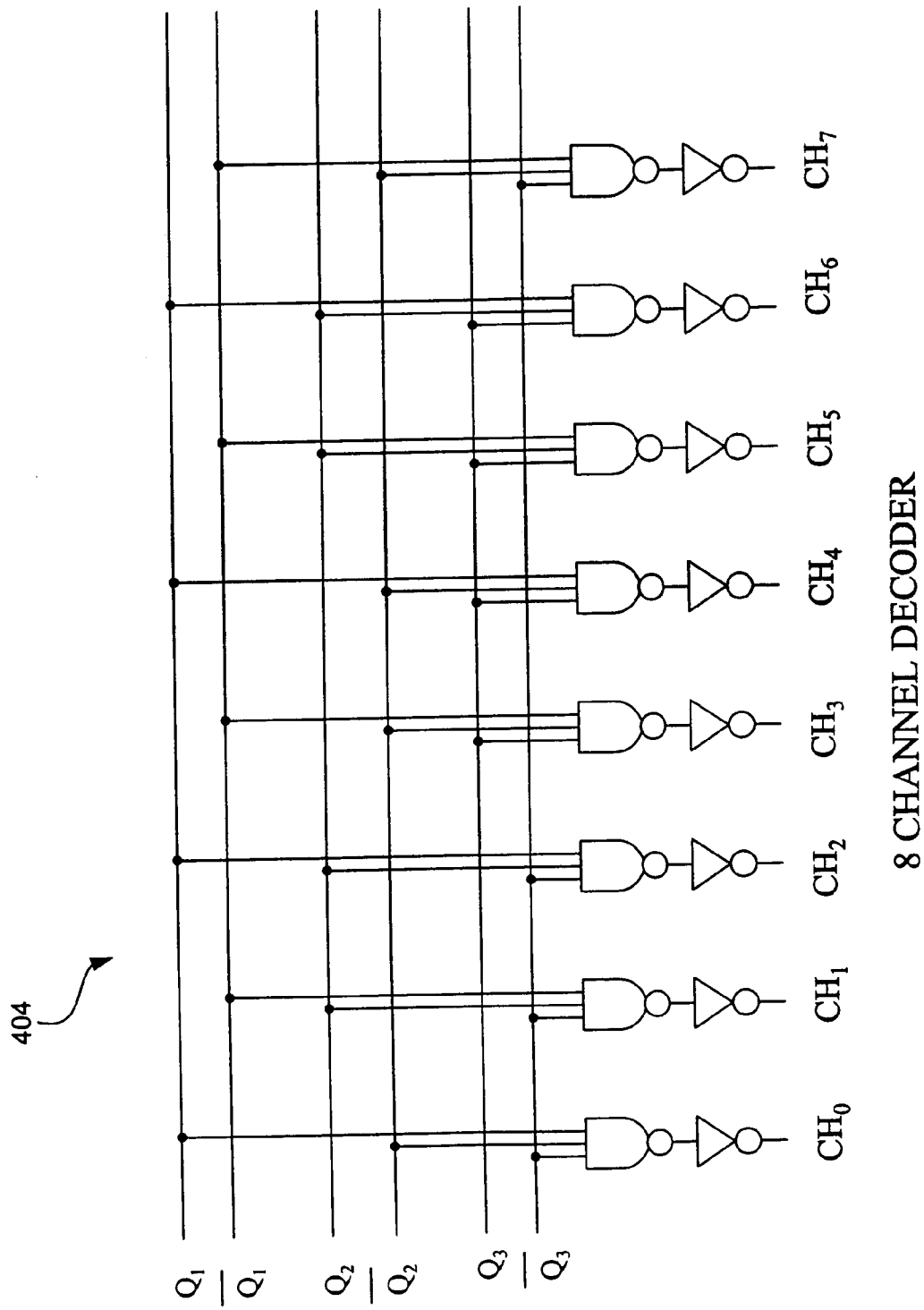
FIG. 6 illustrates the 8-CHANNEL DECODER of the circuit shown in FIG. 4.

FIG. 4 is a block diagram illustrating a circuit 400 for phase channelization control within a tag. The clock signal transmitted by the reader is provided to the DIVIDE BY 16 COUNTER 402, which can be implemented by various means, a preferred version of which is indicated in FIG. 5. The DIVIDE BY 16 COUNTER 402 can be implemented by toggle flip-flops in order to obtain a set of lower frequencies and multiple phases in time. A preferred embodiment of an 8-channel system is illustrated. The 8-CHANNEL DECODER circuit 404 is illustrated in FIG. 6. Each channel output provides an output pulse at the beginning of each channel's sub-clock period. Each of these 8 phase channel outputs is provided to a 1-of-8 CHANNEL SELECTOR 406, or Multiplexer (MUX), in FIG. 4. Following the reception of a START command, the RANDOMIZER CIRCUIT 408 sets a channel assignment, and selects the corresponding channel via the 1-OF-8 CHANNEL SELECTOR 406. The selected channel serves as the clock reference for the tag.

If a SET CHANNEL command is received by the tag, the RANDOMIZER CIRCUIT 408 will set the MUX 406 to the channel specified by the SET CHANNEL command, overriding the random channel selection that was done previously. The issuance of a subsequent START command will re-randomize the channel selection. In either event the CHANNEL MEMORY circuit 410 will store the most recently selected channel, provided that power is supplied to the tag. The CHANNEL MEMORY circuit 410 preferably stores the previously selected channel assignment for a period of at least one second following power loss so that short-duration intermittent power drop-outs do not alter the selected channel assignments. The SYNC command, when issued, resynchronizes the clock and channel timing of some or all tags. The SYNC command preferably acts as an interrupt to suspend an ongoing task. The SYNC command does not alter the channel selection, it merely refreshes it.

Figure 7:
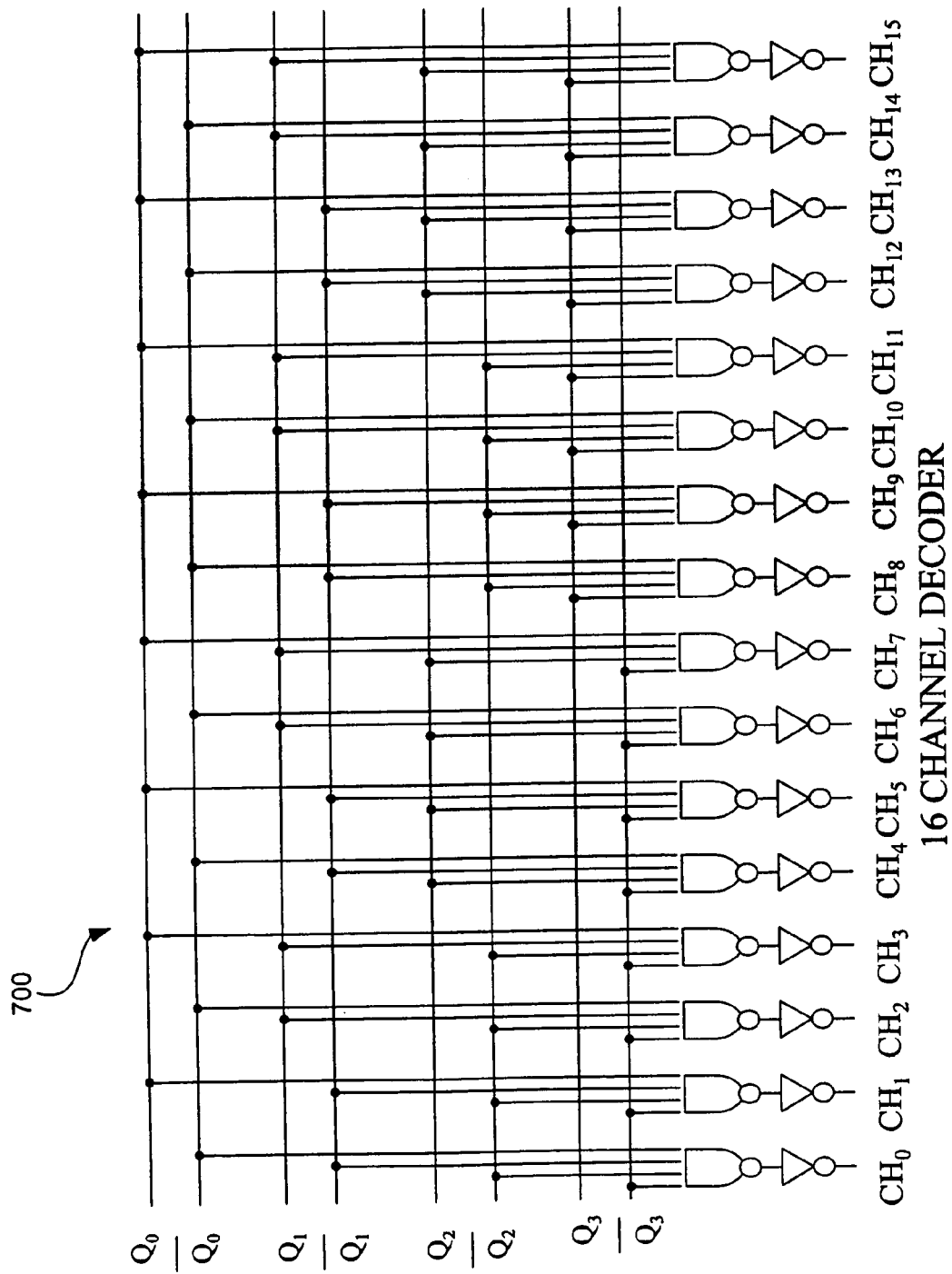
FIG. 7 depicts a circuit for a 16 channel decoder according to one embodiment.

If, for example, a 16 channel system were to be implemented, a 16 channel decoder could be built using the circuit 700 of FIG. 7. In such a case, the Q0 outputs of FF0 in the DIVIDE BY 16 COUNTER 402 would be utilized.

The System

The phase channeling described herein can be used in a number of different systems. An example of such a system is a reader-talks-first (RTF) RFID system using either passive or semi-passive active backscatter transponders as tags. The incorporation of a battery and/or memory into a tag is an optional feature to facilitate longer read range for those who require it and who are prepared to accept the trade-offs associated with battery assisted passive tags. These trade-offs include higher cost, limited longevity, larger form factor, greater weight, and end of life disposal requirements. The benefits include allowing the tag to enter a static suspend mode during periods of nonuse because it is powered independently of a reader signal. Data received by or stored on the tag can be saved while the tag is suspended.

The embodiments herein described can function at most radio frequencies, including, in particular, the UHF range. It should be noted that there may be significant read range and other performance differences at different frequencies, which may be particularly influenced by local RF regulations.

A preferred embodiment operates in the UHF frequency range. Tags reflect, or backscatter, the incident RF energy transmitted by a reader. The characteristics of the backscattered RF energy are altered by the tag electronics and antenna as a function of the data that is to be sent to the reader.

In North America a preferred bandwidth is 902–928 MHz. However, one familiar with the art will recognize that operation at 13.56 MHz, 2450 MHz, or other frequency bands is possible. Each specific frequency band and country may have specific differences in bandwidth, power, modulation and regulatory certification. The 900 MHz band was chosen to optimize tag activation distance as well as data rate.

In a preferred embodiment, when an 8-channel system operates at a clock frequency of 64 kHz with 16 clock cycles per sub-clock, its sub-clock frequency is 4 kHz. Any individual tag responds to the reader at the sub-clock rate, or 4 kbps. While this is not a particularly fast data rate, the utilization of phase channelization with a population of tags greater than the number of channels becomes effectively much faster. Because tags are distributed in 8 channels and any number of tags in each of those eight channels can respond within one sub-clock period, the effective data rate of the tag population is 8 times faster, or 32 kbps.

Because the reader in a preferred 8-channel system transmits two bits of data per sub-clock, the effective reader-to-individual tag data rate is 8 kbps per channel. Therefore, the effective reader-to-tag data rate is 64 kbps for a population of tags.

In comparison, other RFID systems nominally operate at data rates of 4 to 8 kbps, which readily demonstrates the advantage of the invention. Of particular interest, however, is that much higher effective data rates are achieved without having to operate individual tags at high clock frequencies. Because the bulk of the tag circuitry is operating at a frequency of only 4 kHz, the power consumption of the tag is similar to that of a conventional non-channelized system operating at 4 kHz. Therefore, both high multi-tag read rates and long range are achieved simultaneously.

For UHF operation in North America, it is preferable that systems operate as follows. Readers operate as frequency hopping systems in the 902 to 928 MHz band. Systems shall have a minimum of 25 hopping frequencies. Frequencies of hopping shall be accessed in a pseudo random manner consistent with FCC part 15.247. The time on any one frequency channel shall not be greater than 400 ms in a 10 second period. The maximum allowable 20 dB bandwidth of the occupied frequency channel shall be 500 kHz.

As far as reader-to-tag modulation is concerned it is preferred that:

Readers are always frequency hopping with a minimum of 25 hopping frequencies between 902 and 928 MHz.

In the lower power inactive mode the reader develops no amplitude modulation.

During a tag query, the reader uses amplitude modulation. The reader to tag link is OOK, (On-Off Key) with a minimum of 90% modulation depth.

It is also preferred that reader-to-tag encoding is accomplished as follows:

Readers produce a nominal 64 kHz clock that is always sent to the tag or tags. The tags are synchronized to the reader on the negative going edge of the RF envelope i.e. the off portion of the reader transmission.

Data from reader to tag is encoded as pulse width modulation of the low level RF energy between the nominal limits of 1.953 us and 7.8125 us.

1.953 $\mu$s=Logic 0

7.8125 $\mu$s=Logic 1

4.0 $\mu$s=Discrimination Point set by on-tag one-shot

Empty channels look like a sequence of Logic-0 bits.

As far as tag-to-reader modulation is concerned it is preferred that tags develop backscatter modulation to the reader by changing the phase of the reflected signal to the reader. For example, this could be a Bi-Phase Shift Key (BPSK) method where each of the two-phase reflections differ by a nominal 90 degrees. Data is transmitted to the reader from the tag by creating this phase shift at a delay appropriate for each channel of the reader clock.

As shown for the embodiment illustrated in FIG. 3, tags in a given channel can modulate the phase of their backscatter once every sub-clock period. With 8 channels, readers will typically look for tag backscatter for a period of two clock periods. However, readers may increase their receive window time in the case of fewer channels in order to improve read sensitivity, alternatively the reader may also extend (or shorten) individual clock intervals to increase sensitivity and range, or control error rates. In order to implement the invention it is preferred that a system, including the tags used in that system, is capable of supporting the following commands:

broadcast: START command that tests tags, randomizes channel assignment, and initiates the identity search process.

broadcast: SEARCH commands:
  DOWN
  SIDE
  UP
  COMMAND prefix
tag/group: SLEEP command may be issued at the end of or during a partly completed identity search.
tag/group: WAKE command may be issued at the end of or during a partly completed identity search.
tag-specific CONFIRM command is used by a reader to verify that a tag has been identified correctly.
tag/group SET CHANNEL command may be issued to direct a tag or a group of tags into a specified channel.
broadcast: SYNC command interrupts and suspends the current operation being performed and can be used to re-synchronize the clock and channel timing of all tags.

Phase Channel Communication

Phase channeling creates multiple channels, eight in the particular embodiment described, to allow eight different reader channels and eight different tags to communicate concurrently at low speed. Each of the eight channels operates at the same frequency but in different time phases with each of the other channels. Data sampling intervals on both the reader and the tag are staggered so that different operations on different phase channels do not interact with each other.

Furthermore, when phase channeling is implemented, the intervening clocks can be used to control intermediate internal operations within the tag electronics. However, the fundamental operating frequency of the tag electronics is one-eighth the incoming clock frequency. An added advantage to phase channeling is that it simplifies the tag circuitry design, which is often implemented in an integrated circuit (IC) chip. For example, when there are eight channels, each running at one-eighth speed, eight clocks are available for use to control internal operations more precisely. It should be noted that tag electronics could be designed to perform backscatter modulation at anywhere from 1 clock cycle to 14 clock cycles, most preferably 12 clock cycles, following the reader data pair. FIG. 3 illustrates another preferred embodiment when backscatter modulation occurs at 8 clock cycles following the reader data pair. (One versed in the art will recognize that tag responses other than backscatter also can be used in the invention.)

In implementing this invention it is preferred that communications between the reader and tags can occur independently in at least as many as 8 "phase channels", each effectively operating at an 8 kbps data rate (reader-to-tag), wherein each channel is separated from the others by its phase and operates independently of the others. As illustrated in FIGS. 4 through 7, this channel structure means that up to 8 tags are being addressed concurrently and that no tag is internally clocked at more than an 8 KHz rate. This provides several advantages:

Tag power dissipation is reduced which increases range.
  Power is available 8 times during each 8 KHz clock cycle—instead of just once—which reduces power supply droop and improves the robustness of the tag circuit design.
  The tags tolerate 8x greater gate delays, which reduces voltage requirements even further and thereby increases range.
  The 8 clock sub-phases are used to control operation of the tag which improves timing accuracy, which further reduces power dissipation, increases range, simplifies circuit design, and reduces cost of the tag.

When needed, all 8-channels can be used in the same field to increase the tag identification rate to 300 tags/second or higher.

In a shelf environment or in other applications where the maximum tag identification rate isn't needed, the reader installation cost can be reduced by having each reader drive up to 8 separate antennae each operating on a separate phase channel. This form of installation can also be used to greatly reduce interference between adjacent readers.

Rather than waste time interrogating background items over and over again, these items can be assigned by the reader to a "maintenance channel" so that they are ignored by the other channels and the system can operate faster on new items.

Optionally:

A Broadcast Data Clock is set on the falling edge of a 64 kHz pulse string. Data is encoded as pulse width modulation of the low pulse.

All readers are first in a "quiescent" state, and listen for an open slot or frequency channel before beginning to acquire and initiate full power dialog with tags. When detecting an open slot and/or frequency channel, a quiescent reader attempts to go "active", in which it typically transmits at full RF power level, and modulates the RF for the purposes of communicating with tags. Before becoming active, however, a reader must first wait through an internal randomized delay intended to prevent more than one reader from becoming active at the same time. If, despite this feature, two or more readers become active simultaneously, then both will immediately revert to their quiescent state and repeat the randomizing sequence.

When the tags power up, all tags are initially set to a SLEEP state by a power on rest circuit.

When a reader goes active it initially broadcasts a channel-independent 8-bit START code and an 8-bit transmission test code, which is known to and recognized by all tags. This test sequence includes information sent at different power levels and frequencies to check for a robust communication link with the reader. Each tag that successfully receives all of the test code responds by setting itself to a channel, and prepares to receive 2-bit SEARCH commands. Channel selection may be based at least in part on the least significant 3 bits of a tag's internal serial number. Other methods to randomize channels can be utilized within the tag instead of or in addition to the 3 least significant bit method. Channel selection information is stored within the tag circuitry, this information remaining stored until it is changed by a subsequent command (such as START). Tags that do not receive all of the test code successfully remain in the SLEEP state.

A SET CHANNEL command can be inserted to set individual tags or groups of tags into a specific channel. Additionally, channel assignment information will remain stored for a period of at least one-second after the loss of incident RF power to the tag. This provides for short-term intermittent power loss, while preserving phase channel assignment.

If all tags are put into the same channel, the reader can operate in a tag specific speak command mode that calls out specific tags to respond. As such the reader can do a known inventory confirm operation first. As an example, a reader "knows" the last population was 23 specific cans of Tuna. The reader then begins a subsequent inventory by calling out these specific cans. At the end of this inventory those cans that did respond may be excluded from a subsequent global sort using either SLEEP COMMANDS or by assigning those tags to a specific channel.

An identity search on a population of tags is conducted with a series of redundant 2-bit SEARCH codes—DOWN, SIDE, UP. Tags internally mute themselves (backscatter modulation is inhibited) whenever one of more loaded data bits fail to match their internal code. The SEARCH operation is part of the read-mode anti-collision process.

A CONFIRM sequence is performed at the end of the search. A reader calculates an 8-bit CRC (cyclic redundancy check) code based upon what it believes the tag identity to be, and sends it to a tag. The 8-bit CRC code is sufficient to enable the tag to detect multiple bit errors. The tag compares the CRC with a pre-calculated 8-bit code stored in the tag and mutes if there is no match. If there is a match, the tags send another 8-bit stored data code back to the reader, which the reader uses to confirm the transaction. If either code fails to match in the tag or the reader, respectively, the CONFIRM sequence may be repeated, or the tag may be re-acquired by performing another identity SEARCH process.

Sync Command

Due to variations in energy coupling and noise that is typical of RFID system environments, clocking errors within tags can occur. These errors can cause tags to respond inappropriately, thereby slowing or inhibiting communications between readers and tags. Therefore, readers can periodically, or as otherwise deemed necessary, send a SYNC command to re-synchronize the clock and channel timing of all tags so that any clocking errors within tags, if present, are removed. The SYNC command maintains and refreshes all tag channel assignments that were previously established by the START or SET CHANNEL command. If the system is operating in a single-channel mode (Channel #0), channel reference for all tags will remain in Channel #0. Additionally, the SYNC command is used to precede all commands other than two-bit identity SEARCH codes. This signals tags that they will be receiving longer commands, in addition to resynchronizing channel assignments. Thus, the SYNC command acts as an interrupt, suspending a task that is being performed and then allowing that task to continue when the channel is refreshed. Another use of the SYNC command is to perform another or second task or to interject and trigger a command while the first task is in a suspended state. The reader transmits the SYNC command by omitting eight 64 KHz clock cycles. A discriminator within the tag circuitry detects the loss of the clock pulses in order to interpret this command. It will be appreciated by those skilled in the art that omitting a different number of clock cycles to form a SYNC command can be effectively utilized while still practicing the spirit of this invention.

This phase channelization system is designed to work with a binary tree class of anti-collision algorithm, but can be adapted for use with other anti-collision protocols.

Those knowledgeable in the art will be able to extend this phase channelization to different frequencies; to allow the reader to interrupt the transmission of clock pulses, or to extend or shrink the period between certain clock pulses as necessary to improve the performance of the system. These changes may result in non-periodic clocking of tags or cluster-clocking of tags, and that the reader may shift quickly from one of these clocking modes to another, and between 1-channel mode to 2 or more channel modes as appropriate.

While various embodiments have been described above, it should be understood that they have been presented by way of example only, and not limitation. In particular, it is obvious to one skilled in the art that the required channels can be separated not only by phase but alternatively by time intervals, frequency band, polarization, address codes, and other known separation techniques. Thus, the breadth and scope of a preferred embodiment should not be limited by any of the above-described exemplary embodiments, but should be defined only in accordance with the following claims and their equivalents.

What is claimed is:

1. A system for concurrent dialog with multiple radio frequency identification (RFID) tags from a single reader, comprising:
   a reader; and
   a plurality of tags, each tag communicating with the reader concurrently and independently on a separate phase channel, each phase channel being based on at least one particular clock cycle of a clock signal;
   wherein each phase channel operates independently of the other phase channels in a different time phase therefrom.

2. The system as recited in claim 1, wherein each tag selects a channel randomly.

3. The system as recited in claim 1, wherein reader data is encoded in a clock signal via pulse width modulation.

4. The system as recited in claim 1, wherein the reader includes multiple antennae, each operating on a separate channel.

5. A system for concurrent dialog with multiple radio frequency identification (RFID) tags from a single reader, comprising:
   a reader; and
   a plurality of tags, each tag communicating with the reader independently on a separate channel;
   wherein each channel operates independently of the other channels;
   wherein each tag includes a phase channelization control circuit, comprising:
      a counter for dividing the clock signal into multiple phases in time;
      a channel decoder coupled to the counter for generating phase channel outputs;
      a channel selection circuit for setting a channel assignment to serve as a clock reference for the tag; and
      a channel selector coupled to the channel selection circuit for selecting one of the phase channels based on the channel assignment.

6. The system as recited in claim 5, wherein the phase channelization control circuit further comprises a channel memory for storing the channel assignment.

7. The system as recited in claim 6, wherein the channel assignment is stored for at least one second.

8. The system as recited in claim 1, wherein each tag may enter a static suspend mode for a period of greater than one second.

9. The system as recited in claim 1, wherein a SYNC command is executed for resynchronizing clock timing and channel timing.

10. The system as recited in claim 1, wherein each tag may include a power storage device.

11. The system as recited in claim 1, wherein the phase channels are time references for subsequent operation of the tags.

12. A method for concurrent dialog with multiple radio frequency identification (RFID) tags from a single reader, comprising:
   sending an instruction for a plurality of tags to each select a phase channel, each phase channel being based on at least one particular clock cycle of a clock signal;
   broadcasting a clock signal to a plurality of tags; and
   encoding reader data in the clock signal.

13. The method as recited in claim 12, wherein each tag selects a channel randomly.

14. The method as recited in claim 12, wherein the reader data is encoded in the clock signal via pulse width modulation.

15. The method as recited in claim 14, further comprising altering individual clock signal intervals for increasing sensitivity and range.

16. The method as recited in claim 12, further comprising increasing a receive window time for improving read sensitivity.

17. The method as recited in claim 12, further comprising resynchronizing a clock and channel timing of a tag.

18. The method as recited in claim 17, wherein the resynchronization is initiated by the tag in response to a clock interruption.

19. The method as recited in claim 12, further comprising driving multiple antennae each operating on a separate channel.

20. The method as recited in claim 12, wherein reader data for a particular tag is positioned at a predetermined temporal position in the channel of the particular tag wherein each tag selects a channel randomly.

21. The method as recited in claim 12, wherein the channel is selected with reference to a temporal position in the clock signal, the RFID tags communicating with the reader repeatedly on the selected channel.

22. The method as recited in claim 12, wherein each channel is separated from other channels by its phase.

23. A method for channel-based communication with a reader, comprising:
   receiving an instruction to select a phase channel corresponding to at least one particular clock cycle of a clock signal;
   receiving a clock signal;
   selecting a channel; and
   receiving reader data encoded in the clock signal.

24. The method as recited in claim 23, wherein the channel is selected randomly.

25. The method as recited in claim 23, wherein the channel is designated by a command from a reader.

26. The method as recited in claim 23, further comprising changing a phase of a signal reflected to a reader.

27. The method as recited in claim 23, wherein channel selection is based at least in part on a serial number of the tag.

28. The method as recited in claim 23, wherein reader data is encoded in the clock signal via pulse width modulation.

29. The method as recited in claim 23, further comprising setting a channel assignment, wherein the channel is selected based on the channel assignment.

30. The method as recited in claim 29, further comprising storing the channel assignment for at least one second following a power loss.

31. The method as recited in claim 23, further comprising initiating a SYNC command for resynchronizing clock timing and channel timing.

32. A method for channel-based communication with a reader, comprising:
   receiving an instruction to select a channel;
   receiving a clock signal;
   selecting a channel;
   receiving reader data encoded in the clock signal; and
   initiating a SYNC command for resynchronizing clock timing and channel timing;
   wherein the SYNC command suspends a first task, and further comprising performing a second task while the first task is suspended.

33. A method for channel-based communication with a reader, comprising:
   receiving an instruction to select a channel;
   receiving a clock signal;
   selecting a channel;
   receiving reader data encoded in the clock signal; and
   initiating a SYNC command for resynchronizing clock timing and channel timing;
   wherein the SYNC command suspends a task being performed, and further comprising interjecting and triggering a command while the first task is suspended.

34. The method as recited in claim 23, further comprising entering a static suspend mode powered independently of the reader signal.

35. The method as recited in claim 23, further comprising decoding the clock signal into phase channels.

36. The method as recited in claim 23, wherein the selected channel serves as a timing reference for subsequent operation.

37. The method as recited in claim 23, further comprising selecting reader data from the clock signal according to the selected channel.

* * * * *

UNITED STATES PATENT AND TRADEMARK OFFICE
CERTIFICATE OF CORRECTION

PATENT NO. : 6,952,157 B1 Page 1 of 1
DATED : October 4, 2005
INVENTOR(S) : Stewart et al.

It is certified that error appears in the above-identified patent and that said Letters Patent is hereby corrected as shown below:

Column 10,
Line 25, change "charnel" to -- channel --.

Signed and Sealed this

Thirteenth Day of December, 2005

JON W. DUDAS
*Director of the United States Patent and Trademark Office*